J. P. ROACH.
COTTON PICKER.
APPLICATION FILED DEC. 31, 1919.
1,366,837.
Patented Jan. 25, 1921.
2 SHEETS—SHEET 1.
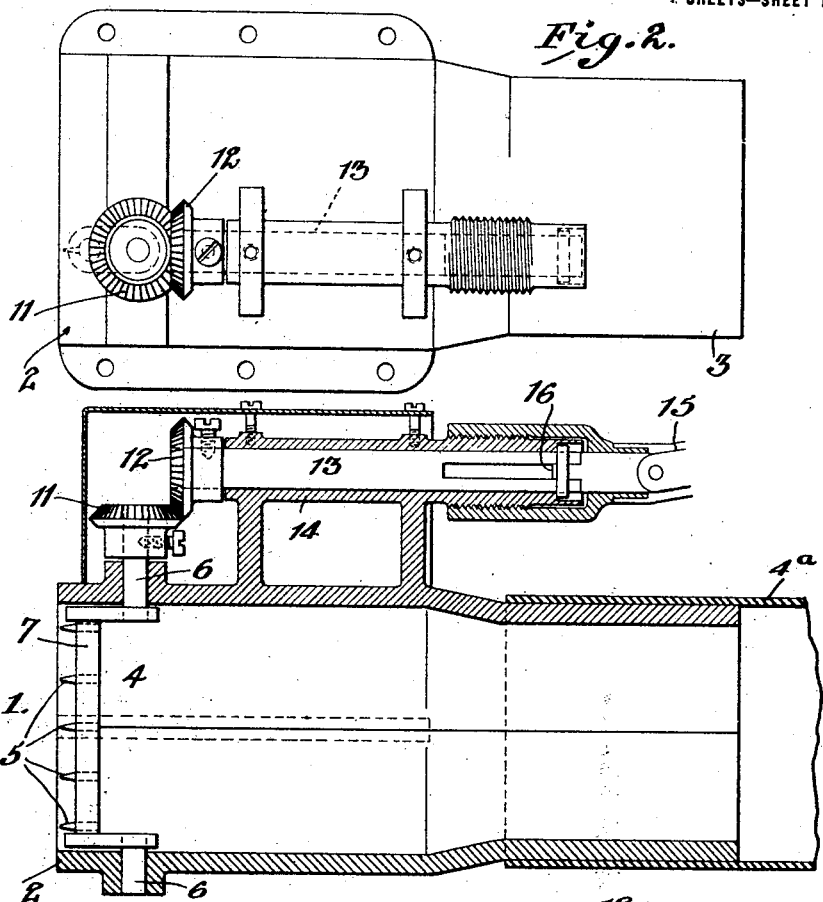
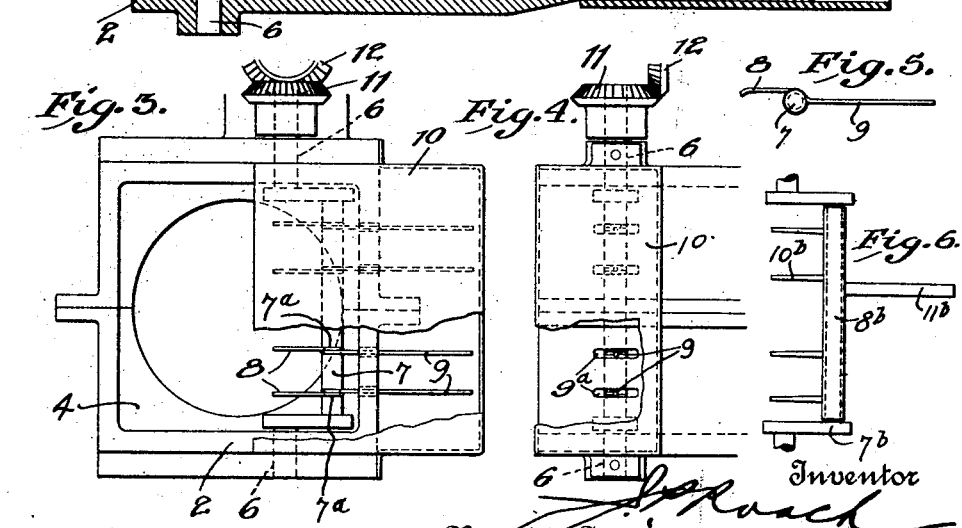
Inventor
J. P. Roach
By his Attorneys
Mason Fenwick Lawrence

UNITED STATES PATENT OFFICE.

JAMES PHILIP ROACH, OF NEW YORK, N. Y.

COTTON-PICKER.

1,366,837.  Specification of Letters Patent.  Patented Jan. 25, 1921.

Application filed December 31, 1919. Serial No. 348,534.

*To all whom it may concern:*

Be it known that I, JAMES PHILIP ROACH, citizen of the United States, residing at New York, in the county of New York and State of New York, have invented certain new and useful Improvements in Cotton-Pickers; and I do hereby declare the following to be a full, clear, and exact description of the invention, such as will enable others skilled in the art to which it appertains to make and use the same.

This invention relates to pneumatic cotton pickers and refers particularly to an improvement in a mechanical means for stripping the cotton from the boll.

The invention contemplates the provision of a simple and effective means located in the intake mouth of a suction nozzle, for stripping the cotton from the boll and advancing the same within the nozzle to be acted upon by the draft or suction which functions to remove and carry it into a suitable receptacle.

Due to its inherent nature, it is commonly known that cotton has a tendency to adhere closely to the stripping means heretofore employed in devices of this character, and it is therefore an object of this invention to produce a stripping means which after removing the cotton from the boll, will function to readily release the same under the action of the draft and to this end, use is made of a picking finger or fingers and a simple mechanism for driving the same to cause the points thereof to travel in substantially a heart-shaped course, said points during the stripping action, describing the convex portion of said course at a fairly high rate of speed, and during the releasing action describing a small arcuate path at a reduced rate of speed, during which time the points are presented toward the line of direction of the suction draft where they may be effectively acted upon to allow for a complete removal of the cotton therefrom.

With the above recited and other objects in view, some of which will be apparent hereafter, reference is made to the following detailed description, appended claims and the accompanying drawings forming a part of this application and in which:

In the drawings:

Figure 1 is a central longitudinal section through the cotton picker head.

Fig. 2 is a side elevation of the cotton picker head at right angles to the point of view of Fig. 1.

Fig. 3 is a plan view of Fig. 2 with certain parts broken away for clearness.

Fig. 4 is a fragmentary side elevation at right angles to Fig. 2.

Fig. 5 is a section through the crank shaft showing one of the fingers mounted thereon.

Fig. 6 is a modified form of finger from that shown in Fig. 5, showing a plurality of fingers.

Figure 7:
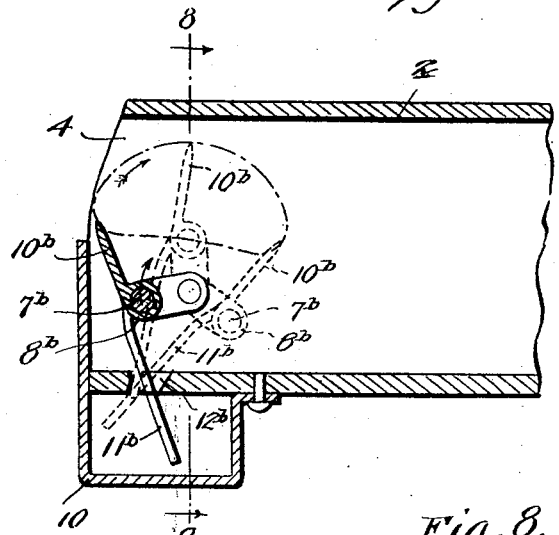
Fig. 7 is an enlarged longitudinal sectional view through the suction nozzle, diagrammatically illustrating the path of travel of the points of the picking fingers and illustrating in full and dotted lines several positions of the fingers.

Referring to the drawings by characters of reference a suction nozzle 2 of substantially cylindrical construction includes an outlet 3 and an inlet 4, said outlet having fitted thereover one end of a flexible hose $4^a$, leading through any suitable type of suction draft creating means to a receptacle (not shown) into which the cotton is deposited.

The means for stripping the cotton from the boll constitutes the invention and the same includes a crank shaft 6 journaled in the inlet 4 of the suction nozzle, the crank pin 7 thereof being provided with a plurality of spaced annular peripheral grooves $7^a$. The picking fingers 5 as illustrated in the first five figures of the drawings are formed of a single length of stout wire, bent or coiled medially to form eyes which are adapted to lie within the grooves $7^a$ for mounting the fingers upon the crank pin 7, for swinging movements. The portions 8 of the fingers constitute the picking fingers proper, while the other ends 9, constitute guide arms and operate in the slots $9^a$ formed in the side of the suction nozzle adjacent its inlet 4. A housing 10 which partially covers the inlet end of the nozzle also covers and protects the exposed extremities of the guide arms 9. Any suitable mechanism for rotating the crank shaft 6 may be employed and as here shown, the same comprises a beveled gear 11 keyed to the extremity of the crank shaft which extends through one of the journal openings in one of the sides of said nozzle, said gear meshing with a similar gear 12 which is keyed to a stub shaft 13 mounted in the bearing 14. The rear end of said shaft bearing threadedly receives an end of a conduit for a flexible shaft 15, connected to the stub shaft by a coupling 16.

In practice, the suction draft means may be mounted on a wheeled carriage, the power plant for driving the same also serving to drive the flexible shafts. Any number of suction nozzles may be employed in connection with a single suction draft means and each nozzle is manned by a separate person for best results.

Figure 8:
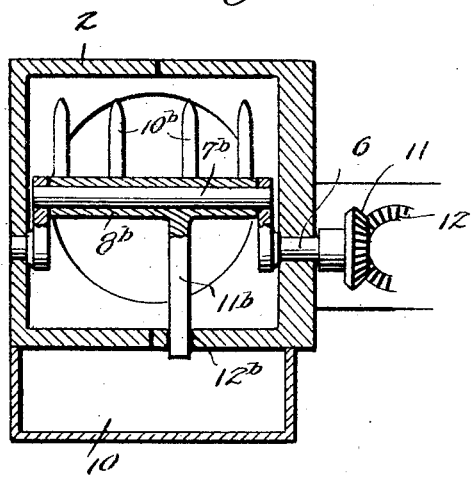
Fig. 8 is a sectional view taken approximately on the line 8—8 of Fig. 7.

In the modified form illustrated in Figs. 6, 7 and 8, a sleeve 8$^b$ provided with a plurality of picking fingers 10$^b$ extending therefrom is mounted on the crank pin 7$^b$ for rotary movement. A single guide arm 11$^b$ is adapted to operate in a slot 12$^b$ for causing the points of the fingers to describe a substantially heart-shaped course as clearly illustrated in Fig. 7 of the drawings.

In operation of the stripping means, when the crank shaft is rotated in the direction of the arrow, the points of the picking fingers will travel in a substantially heart-shaped course due to the engagement of the guide arm or arms in the slots. During the stripping action the points of the fingers will describe the convex portion of the course at a high rate of speed, digging deeply into the cotton, separating it from the boll, and advancing it into the nozzle. When the points reach the end of the convex stroke, they will describe a small arc at a reduced rate of speed, at which time they will be presented in the direction of the line of travel of the suction draft to permit the same to effectively act upon the cotton to effect its entire and complete removal therefrom. The fingers will then return rapidly to repeat the stripping action traveling succesively through a concave path and a small arc where the action will be repeated.

It is to be understood that I reserve the right to embodiments other than those actually illustrated herein, to the full extent indicated by the general meaning of the terms in which the claims are expressed and by variations in the phraseology of the same.

Claims:

1. In a pneumatic cotton picker, means for stripping the cotton from the boll comprising a picking finger journaled in the intake of the suction nozzle and means for driving the same to cause the point thereof to travel in a substantially heart-shaped course.

2. In a pneumatic cotton picker, a picking finger journaled in the intake end of the suction nozzle for stripping the cotton from the boll and advancing the same into said nozzle, and means for driving said fingers to cause the point to travel in a convex path at a high rate of speed during the stripping action, and at a reduced rate of speed in a relatively small arcuate path with respect to the path of travel at the high rate of speed, during the releasing action.

3. In a pneumatic cotton picker, a picking finger journaled in the intake end of the suction nozzle for stripping the cotton from the boll and advancing the same into said nozzle, and means for driving said fingers to cause the point to travel in a substantially heart-shaped course, said point during the stripping action describing the convex portion of the course at a high rate of speed and during the releasing action describing a relatively small arc at a reduced rate of speed during which time the point is disposed toward the directon of the travel of the suction draft through the nozzle.

4. The combination with the suction nozzle of a pneumatic cotton picker, of means for stripping the cotton from the boll and advancing the same into the nozzle comprising a picking finger journaled in the intake end thereof, and means for driving the same to cause the point thereof to travel in a convex path at a high rate of speed during the stripping and advancing action and in a relatively small convex path at a reduced rate of speed during the releasing action, the arcuate movement serving to dispose said point in the direction of travel of the suction draft through the nozzle whereby to permit of the complete removal of the cotton therefrom.

5. In a pneumatic cotton picker, means for stripping the cotton from the boll comprising a picking finger and means positively engaging said fingers for driving the points of the same at a variable rate of speed.

6. In a pneumatic cotton picker, means for stripping the cotton from the boll comprising a picking finger journaled in the suction nozzle thereof and means for driving the same to cause the point to travel at a variable rate of speed in a substantially heart-shaped course.

7. The combination with the suction nozzle of a pneumatic cotton picker, of means for stripping the cotton from the boll comprising a crank journaled transversely within the intake end of the nozzle, means for driving the same, a picking finger mounted for swinging movements on the crank, a slotted portion in the nozzle and a guide arm extending into said slotted portion for effecting a substantially heart-shaped movement of the point of the picking finger at a variable rate of speed.

8. In a pneumatic cotton picker, means for stripping the cotton from the boll comprising a picking finger mounted in the intake end of the suction nozzle and means for positively driving the same at a high rate of speed during the stripping action and at a reduced rate of speed during the releasing action.

In testimony whereof I affix my signature.

JAMES PHILIP ROACH.